United States Patent Office 3,356,684
Patented Dec. 5, 1967

3,356,684
NOVEL COMPOSITIONS FOR THE TREATMENT
OF HELMINTHIASIS
Walter E. Buting and Cameron Ainsworth, Indianapolis,
Ind., assignors to Eli Lilly and Company, Indianapolis,
Ind., a corporation of Indiana
No Drawing. Continuation of application Ser. No.
438,782, Mar. 10, 1965. This application July 28,
1966, Ser. No. 568,675
10 Claims. (Cl. 260—296)

The present application is a continuation of our co-pending application Ser. No. 438,782, filed Mar. 10, 1965, now abandoned, which is in turn a continuation-in-part of our then co-pendent application Ser. No. 176,773, filed Mar. 1, 1962, now abandoned.

This invention relates to novel compounds useful for the treatment of helminthiasis and to a process for the preparation thereof. More particularly this invention relates to hitherto unknown 3-substituted oxadiazole derivatives and their preparation.

Helminthiasis is recognized as one of the world's major medical and veterinary problems. The serious consequences of helminth infections are not limited to the situations in which the parasitic infection is so severe that death results. The sequelae of nonfatal infections, though perhaps less dramatic, are nevertheless serious and of great economic importance. In human beings, these are reflected in a greatly decreased initiative and ability to do productive work and in a general impairment of health. In animals, the economic losses brought about by parasitic infections of species grown commercially are staggering. The debilitating effects which can be the result of insidious infections result in a decreased feed efficiency and carcass quality and increase the susceptibility of the animals to other disease conditions. Drugs which would control helminthiasis would be welcomed by practitioners in both human and veterinary medicine.

It is an object of this invention to provide drugs effective in treating helminthiasis. It is a further object of the invention to provide a novel method for the preparation of such drugs.

In accordance with the invention, there are provided 3-substituted 1,2,4-oxadiazoles useful for the treatment of helminthiasis. The compounds of the invention are represented by the following formula:

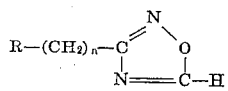

wherein $n$ is a whole number from 0 to 3 and R represents a substituted or unsubstituted aryl or heterocyclic group having, when substituted, one or more substituents such as $C_1$-$C_4$ alkyl, $C_1$-$C_4$ alkoxy, amino, lower alkylamino or dialkylamino having up to six carbons, hydroxy, halo, nitro, cyano, or trifluoromethyl.

Illustrative of the aryl groups which can be employed are phenyl, chlorophenyl, bromophenyl, fluorophenyl, nitrophenyl, tolyl, xylyl, ethylphenyl, butylphenyl, methoxyphenyl, hydroxyphenyl, aminophenyl, methylaminophenyl, ethylaminophenyl, dimethylaminophenyl, diethylaminophenyl, dipropylaminophenyl, dichlorophenyl, methylchlorophenyl, cyanophenyl, trifluoromethylphenyl, naphthyl, fluorenyl, and the like.

Among the heterocyclic groups that can be employed are furyl, pyridyl, picolyl, thienyl, thiazolyl, oxazolyl, pyrazolyl, nitropyridyl, halopyridyl, and the like. In general, it may be said that R can be any group which is available via the nitrile employed as one of the starting materials in the synthesis.

Although many derivatives of 1,2,4-oxadiazole are known in the art, monosubstituted derivatives such as are represented by the above structural formula were not available prior to this invention since the methods employed for the synthesis of the disubstituted compounds are not generally suitable for the preparation of the monosubstituted derivatives. An important feature of the present invention, therefore, is a novel process for the preparation of monosubstituted 1,2,4-oxadiazoles.

The compounds of the present invention can be prepared by the reaction of an appropriately substituted amidoxime of the formula

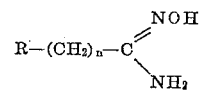

wherein R and $n$ have the above assigned meanings, with an excess of ethyl orthoformate, also known as triethyl orthoformate, preferably at the reflux temperature of the mixture. The required amidoximes can be prepared by methods known in the art, for example, by the reaction of the appropriate nitrile, hydroxylamine hydrochloride, and sodium or potassium carbonate in aqueous ethanol. The reaction of the amidoxime with ethyl orthoformate will take place over a considerable temperature range, and temperatures above the reflux temperature can be employed by heating the reactants in a pressure vessel. The optimum reaction time, of course, will vary to some extent according to the nature of the reactants and the temperature at which the reaction is carried out. As a rule when the reaction is carried out at temperatures higher than the reflux temperature, a shorter reaction time can be employed. In general, reaction times of from about two to about twenty-four hours at temperatures from about 75° C. to about 250° C. can be employed, preferably about two to five hours at reflux temperature. Prolonged heating beyond the time necessary to complete the reaction is undesirable since the desired 3-substituted 1,2,4-oxadiazoles tend to undergo decomposition upon extended heating.

In an alternative method for the preparation of the 3-substituted 1,2,4-oxadiazoles, the appropriately substituted amidoxime is heated with formic acid to produce the desired compound. In still another method, the amidoxime is heated, generally at the reflux temperature of the mixture, with the mixed anhydride derived from acetic anhydride and formic acid. Just as in the method employing ethyl orthoformate, the reaction time and the temperature at which the reaction is conducted are interdependent and a wide range of conditions can be employed. Generally, reaction times of one to five hours at reflux temperatures are satisfactory.

The 3-substituted 1,2,4-oxadiazoles can be recovered directly from the reaction mixtures by employing distillation or recrystallization techniques. It is especially important to avoid prolonged exposure to basic conditions in working up the reaction mixtures inasmuch as the compounds are more or less unstable in the presence of base and decompose to give, among other decomposition products, the nitriles from which the starting amidoximes were derived.

The nitrogen atoms of the oxadiazole nucleus are not sufficiently basic to permit salt formation with acids. However, the substituent in the 3-position can carry basic groups capable of forming salts, and such salts are within the scope of this invention. These salts are prepared by the conventional methods known in the art. Typical acid addition salts are the hydrochlorides, hydrobromides, hydroiodides, sulfates, phosphates, acetates, citrates, oxalates, maleates, malates, succinates, tartrates, tosylates, embonates, and the like.

The compounds of the present invention are valuable chemotherapeutic agents in the treatment of helminthiasis. Of particular interest in their activity against the trichostrongyles *Nematospiroides dubius* in mice and *Nip-*

*postrongylus muris* in rats in single oral doses as low as 50 mg./kg. of host body weight. In addition, the compounds are effective against hookworm and other trichostrongylid infections. At somewhat higher doses, both species of mouse pinworms, *Syphacia obvelata* and *Aspiculuris tetraptera* are controlled.

For the treatment of helminthiasis, the compounds can be given in doses of from about 50 to about 1000 mg./kg. of host body weight, the lower doses, of course, being less completely effective. A preferred dose for most purposes is about 200 mg./kg. The drugs can be administered as a single dose, or, alternatively, in multiple doses. A particular advantage of the compounds is their lack of toxicity at doses substantially greater than those at which satisfactory therapeutic results are obtained. Thus, for example, while some of the compounds are effective in single oral doses as low as 50 mg./kg., little or no toxicity is observed when the same compounds are given at doses as high as 1000 mg./kg.

Certain of the compounds, as for example, 3-phenyl-1,2,4-oxadiazole and 3-p-chlorophenyl-1,2,4-oxadiazole also have anti-convulsant activity.

The compounds can be employed in any of a variety of dosage forms, which may include the drug alone or in combination with a pharmaceutical excipient such as a solid or liquid diluent, buffer, binder, coating material, preservative, emulsifier, or the like, the only limitation being the relative instability of the compounds under basic conditions. The solid dosage forms are especially convenient to administer and may, in one embodiment of the invention drection toward the therapy of helminthiasis in domestic animals, comprise the selected compound in admixture with the animals' feed. Other solid dosage forms, such as tablets, capsules, and boluses comprising the anthelmintic agent and one or more of the commonly used diluents such as talc, lactose, starch, magnesium stearate, methylcellulose, and the like, can be employed with equally good results. Liquid dosage forms such as solutions, suspensions, drenches, and the like are equally effective. The compounds can be administered orally in single or multiple doses and are also effective when given by injection, for example subcutaneously. The latter property is especially surprising, since the parasites reside within the gastrointestinal tract and only very rarely are drugs administered by injections effective against such parasites.

In order to describe the invention more completely, the following examples are provided by way of illustration, but it s not intended that the scope of the invention be limited thereto.

*Example 1*

A solution of 17 g. of p-chlorobenzamidoxime (M.P. 130° C. in 100 ml. of ethyl orthoformate is heated under reflux for four hours. The reaction mixture is distilled under vacuum and the 3-p-chlorophenyl-1,2,4-oxadiazole, boiling at about 140° C. at about 10 mm. mercury pressure, is collected. The product crystallizes in the condenser and melts at about 100–103° C.

*Analysis.*—Calc.: C, 53.20; H, 2.79; N, 15.51. Found: C, 53.32; H, 3.04; N, 15.21.

*Example 2*

The procedure of Example 1 is followed using 5 g. of benzamidoxime, 25 ml. of ethyl orthoformate, and a reflux period of eight hours. The 3-phenyl-1,2,4-oxadiazole so obtained boils at about 95° C. at about 10 mm. mercury pressure and has a refractive index of $n_D^{25}=1.5535$.

*Analysis.*—Calc.: C, 65.75; H, 4.14; N, 19.17. Found: C, 65.84; H, 4.46; N, 19.25.

*Example 3*

A solution of 15 g. of p-bromobenzamidoxime in 100 ml. of ethyl orthoformate is heated at reflux temperature for four hours. Upon cooling, the mixture solidifies. The mass is recrystallized from ethanol to yield 3-p-bromophenyl-1,2,4-oxadiazole melting at about 110° C.

*Analysis.*—Calc.: N, 12.45. Found: N, 12.17.

*Example 4*

By following the procedure of Example 1 with 10 g. of m-chlorobenzamidoxide (M.P. 117–120° C.) and 100 ml. of ethyl orthoformate and employing a reaction time of three hours, 3-m-chlorophenyl-1,2,4-oxadiazole is obtained, boiling at about 126° C. at about 8 mm. mercury. M.P. about 42° C.

*Example 5*

3-m-trifluoromethylphenyl-1,2,4-oxadiazole is obtained according to the procedure of Example 1 from 8 g. of m-trifluoromethylbenzamidoxide (M.P. 75–85° C.) and 100 ml. of ethyl orthoformate with a reaction time of two hours. B.P. 110–120° C./8 mm.

*Analysis.*—Calc.: N, 13.86. Found: N, 12.62.

*Example 6*

The amidoxide prepared from β-phenylpropionitrile, hydroxylamine hydrochloride, and potassium carbonate in ethanol is obtained as an oil which fails to crystallize. A solution of 23 g. of the crude oil in 200 ml. of ethyl orthoformate is heated under reflux for three hours. The excess ethyl orthoformate is removed under vacuum and the residue is distilled under reduced pressure. The 3-β-phenylethyl-1,2,4-oxadiazole so obtained boils at about 135° C. at about 8 mm. and has a refractive index of $n_D^{25}=1.5265$.

*Analysis.*—Calc.: N, 16.08. Found: N, 15.65.

*Example 7*

A solution of 8 g. of 3-chloro-4-methylbenzamidoxime (M.P. 128–131° C.) in 50 ml. of ethyl orthoformate is heated under reflux for two hours. The product is isolated as in Example 3. The 3-(3-chloro-4-methylphenyl)-1,2,4-oxadiazole melts at about 92° C.

*Analysis.*—Calc.: C, 55.53; H, 3.63. Found: C, 55.16; H, 3.89.

*Example 8*

By employing the procedure of Example 1 with 8 g. of o-chlorobenzamidoxide, 50 ml. of ethyl orthoformate and a reaction time of one hour, 3-o-chlorophenyl-1,2,4-oxadiazole is obtained.

*Example 9*

A solution of 10 g. of nicotinamidoxime in 75 ml. of ethyl orthoformate is heated under reflux overnight. The product is isolated by cooling the reaction mixture and recrystallizing the solid residue from Skelly B. The 3-(3-pyridyl)-1,2,4-oxadiazole so obtained melts at about 91° C.

*Analysis.*—Calc.: C, 57.14; H, 3.43; N, 28.56. Found: C, 56.95; H, 3.71; N, 28.39.

*Example 10*

3-o-tolyl-1,2,4-oxadiazole is obtained according to the procedure of Example 1 from 25 g. of 2-methylbenzamidoxime (M.P. about 120–130° C.) and 200 ml. of ethyl orthoformate. B.P. 115–117° C./8 mm.

*Analysis.*—Calc.: N, 17.49. Found: N, 16.78.

*Example 11*

3-m-tolyl-1,2,4-oxadiazole is obtained according to the procedure of Example 1 from 8 g. of 3-methylbenzamidoxime (M.P. 120° C.) and 100 ml. of ethyl orthoformate with a two-hour reflux period. B.P. 115° C./8 mm.

*Analysis.*—Calc.: N, 17.49. Found: N, 17.20.

*Example 12*

By employing the procedure described in Example 1, 3-p-tolyl-1,2,4-oxadiazole is obtained from 4-methylbenzamidoxime. B.P. 115° C./10 mm.

Example 13

3-p-methoxyphenyl-1,2,4-oxadiazole is obtained according to the procedure of Example 1 from 8 g. of p-methoxybenzamidoxime (M.P. 120–125° C.) and 100 ml. of ethyl orthoformate, with a reaction time of two and one-half hours. B.P. 145° C./8 mm.

*Analysis.*—Calc.: N, 15.90. Found: N, 14.69.

Example 14

A solution of 20 g. of p-chlorophenylacetamidoxime (M.P. about 110–112° C.) in 200 ml. of ethyl orthoformate is heated under reflux for two hours. The excess ethyl orthoformate is removed under vacuum and the residue is divided into several small portions prior to distillation at reduced pressure. The 3-p-chlorobenzyl-1,2,4-oxadiazole so obtained distills at about 140° C. at about 8 mm. mercury pressure and has $n_D^{25}=1.5462$.

Example 15

By following the procedure of Example 1 using 10 g. of phenylacetamidoxime and 100 ml. of ethyl orthoformate with a reflux time fo two hours, 3-benzyl-1,2,4-oxadiazole is obtained. The product boils at about 118° C. at about 10 mm. mercury pressure.

*Analysis.*—Calc.: C, 67.48; H, 5.03; N, 17.49. Found: C, 68.11; H, 5.20; N, 18.35.

Example 16

A mixture of 10 g. of p-chlorobenzamidoxime and 25 ml. of formic acid is heated under reflux for one hour. The reaction mixture is cooled and diluted with water and the solid which is precipitated is collected by filtration. Recrystallization from ethanol affords 3-p-chlorophenyl-1,2,4-oxadiazole melting at about 100° C.

Example 17

A mixture of 20 ml. of acetic anhydride and 8.5 ml. of formic acid is heated for two hours to produce the mixed anhydride. To this are added 5 g. of p-chlorobenzamidoxime and the resulting mixture is heated under reflux for one hour. The 3-p-chlorophenyl-1,2,4-oxadiazole is isolated by the procedure of Example 14 and melts at about 100–103° C.

We claim:

1. A compound of the formula

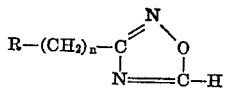

wherein n is a whole number from 0 to 3; R is selected from the group consisting of phenyl, naphthyl, fluorenyl, phenyl substituted by a member of the group consisting of lower alkyl of 1 to 4 carbon atoms, lower alkoxy of 1 to 4 carbon atoms, amino, lower alkylamino of 1 to 6 carbon atoms, dialkylamino of 2 to 6 carbon atoms, hydroxy, chloro, nitro, cyano, and trifluoromethyl, and a heterocyclic ring selected from the group consisting of pyridyl, thienyl, furyl, thiazolyl, oxazolyl, and pyrazolyl.

2. A compound as in claim 1, said compound being 3-p-chlorophenyl-1,2,4-oxadiazole.

3. A compound as in claim 1, said compound being 3-phenyl-1,2,4-oxadiazole.

4. A compound as in claim 1, said compound being 3-(3-pyridyl)-1,2,4-oxadiazole.

5. A compound as in claim 1, said compound being 3-benzyl-1,2,4-oxadiazole.

6. The process for preparing a compound of the formula

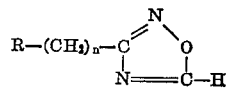

wherein n is a whole number from 0 to 3; R is selected from the group consisting of phenyl, naphthyl, fluorenyl, phenyl substituted by a member of the group consisting of lower alkyl of 1 to 4 carbon atoms, lower alkoxy of 1 to 4 carbon atoms, amino, lower alkylamino of 1 to 6 carbon atoms, dialkylamino of 2 to 6 carbon atoms, hydroxy, halo, nitro, cyano, and trifluoromethyl, and a heterocyclic ring selected from the group consisting of pyridyl, thienyl, furyl, thiazolyl, oxazolyl and pyrazolyl, which comprises commingling an amidoxime of the formula

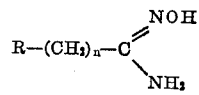

wherein R and n are defined as above, with an excess of ethyl orthoformate, heating the mixture at a temperature between about 75° C. and about 250° C. effective to cause reaction thereof, and recovering the resulting product.

7. The process of claim 6 which comprises commingling p-chlorobenzamidoxime with an excess of ethyl orthoformate, heating the mixture at a temperature between about 75° C. and about 250° C. effective to cause reaction thereof, and recovering the resulting 3-p-chlorophenyl-1,2,4-oxadiazole.

8. The process of claim 6 which comprises commingling benzamidoxime with an excess of ethyl orthoformate, heating the mixture at a temperature between about 75° C. and about 250° C. effective to cause reaction thereof, and recovering the resulting 3-phenyl-1,2,4-oxadiazole.

9. The process of claim 6 which comprises commingling nicotinamidoxime with an excess of ethyl orthoformate, heating the mixture at a temperature between about 75° C. and about 250° C. effective to cause reaction thereof, and recovering the resulting 3-(3-pyridyl)-1,2,4-oxadiazole.

10. The process of claim 6 which comprises commingling phenylacetamidoxime with an excess of ethyl orthoformate, heating the mixture at a temperature between about 75° C. and about 250° C. effective to cause reaction thereof, and recovering the resulting 3-benzyl-1,2,4-oxadiazole.

References Cited

Barrans, Chem. Abstracts, vol. 54, col. 9900 (1959).
Behr in Wiley, Five-and-Six Membered Compounds with Nitrogen and Oxygen (excluding Oxazoles) (1962) p. 248 (Interscience Publ.).
Clarke, J. Chem. Soc. (London), 1954, pp. 4251–53.
Elderfield, "Heterocyclic Compounds," vol. 7, pp. 508–11 (1960).
Gastaldi et al., Gazz. Chim. It., vol. 56, p. 556 (1926).
Lenaers et al., Chem. Abstracts, vol. 55, col. 27283 (1961).

JOHN D. RANDOLPH, *Primary Examiner*

WALTER A. MODANCE, *Examiner.*

H. I. MOATZ, *Assistant Examiner.*